United States Patent [19]

Pradelle

[11] Patent Number: 5,269,660
[45] Date of Patent: Dec. 14, 1993

[54] METHOD AND AN INSTALLATION FOR ADJUSTING THE FLOW RATE OF AIR IN A NETWORK OF DUCTS

[75] Inventor: Bernard Pradelle, Limoges, France

[73] Assignee: Compagnie Generale des Matieres Nucleaires, Velizy Villacoublay, France

[21] Appl. No.: 836,016
[22] PCT Filed: Jul. 2, 1991
[86] PCT No.: PCT/FR91/00532
§ 371 Date: Feb. 26, 1992
§ 102(e) Date: Feb. 26, 1992
[87] PCT Pub. No.: WO92/00492
PCT Pub. Date: Jan. 9, 1992

[30] Foreign Application Priority Data

Jul. 2, 1990 [FR] France .................. 90 08328

[51] Int. Cl.$^5$ .................................... F04D 27/00
[52] U.S. Cl. ............................... 417/18; 417/20; 417/45; 417/53; 417/63
[58] Field of Search ............. 417/18, 20, 45, 53, 417/63

[56] References Cited

U.S. PATENT DOCUMENTS

| | | | |
|---|---|---|---|
| 4,158,527 | 6/1979 | Burkett | 417/18 |
| 4,225,289 | 9/1980 | Burkett | 417/20 |
| 4,468,171 | 8/1984 | Katsumata et al. | 417/20 |
| 4,526,513 | 7/1985 | Bogel | 417/10 |
| 5,137,428 | 8/1992 | Poll et al. | 417/45 |

FOREIGN PATENT DOCUMENTS 3321555 8/1984 Fed. Rep. of Germany.
3805152 7/1989 Fed. Rep. of Germany.

*Primary Examiner*—Richard A. Bertsch
*Assistant Examiner*—David W. Scheuermann
*Attorney, Agent, or Firm*—Larson and Taylor

[57] ABSTRACT

The installation serves to adjust the flow rate of air in a network of ducts such as a mine. It comprises a fan (10) provided with an electric motor (16) powered at a variable frequency. The installation also includes a converter having an adjustable output frequency and measuring means (12, 22) for measuring the flow rate and the total pressure supplied by the fan. It also includes a processor (20), a memory (26) for storing in digital form at least one total-pressure/flow-rate characteristic curve, and optionally a pressure/flow-rate characteristic curve of the fan at at least one predetermined speed; means (30) for displaying said curves; and data input means enabling a reference value ($Q_c$) to be given to the flow rate to be conveyed by the network, the central calculation unit (14) being designed to calculate the resistance (R) of the network and the flow rate (Q) flowing therethrough at a given instant on the basis of signals provided by the measuring means, and being designed to calculate the speed to be given to the fan by interpolation on the basis of the results of the preceding calculation and of the reference value for the flow rate.

8 Claims, 4 Drawing Sheets

METHOD AND AN INSTALLATION FOR ADJUSTING THE FLOW RATE OF AIR IN A NETWORK OF DUCTS

The invention relates to adjusting the flow rate of air in a network of ducts, and it is applicable, in particular, to adjusting the air supply flow rate in a mine or in industrial or underground works.

The flow of air through the network is generally maintained by one or more fans. The air flow rate must be sufficient to ensure the comfort and the safety of workers: in particular it must be sufficient to maintain acceptable chemical and physical qualities for the air in the network, in particular by diluting harmful gases, by removing dust, and by limiting temperature rises. In practice, the reference air flow rate to be maintained varies a great deal with the activity in the works and must therefore be adjustable by controlling the fans.

There are several ways in which an air flow rate maintained by a fan may be adjusted. Fans may be provided with variable-pitch blades, but that solution requires an expensive mechanical system and leads to pauses whenever the flow rate is changed. It is not appropriate when the reference flow rate needs to be modified continuously or frequently. The invention performs adjustment by controlling the speed of rotation of the fan, which is more flexible and can easily be achieved by using a fan having an asynchronous motor powered by a variable frequency converter capable of operating over a wide range.

The invention seeks in particular to provide a method and apparatus for adjusting the flow rate of air by controlling the frequency at which the motor of a ventilation fan or of each ventilation fan in a network of ducts is powered in a manner that is at least semi-automatic, and for optimizing operating conditions when a plurality of fans are used.

To this end, the invention provides, in particular, a method of adjusting air flow rate in a network of ducts (such as a mine, or industrial or underground works) by controlling the speed of at least one rotary fan for causing air to flow, the fan being provided with an electric motor whose speed is a function of the frequency delivered by an adjustable frequency converter controllable by a central calculation unit, the method being characterized in that:

a) at least one characteristic curve of total pressure as a function of flow rate at least one predetermined speed is stored in the central calculation unit;

b) at least the flow velocity and the total pressure supplied by the fan are measured under steady operating conditions and the flow rate at a current instant and the resistance of the gallery are deduced therefrom by calculation by means of the central unit;

c) the reference flow rate to be supplied by the fan is input into the central unit, and the theoretical total pressure to be supplied by the fan is deduced therefrom by calculation by the central unit;

d) the speed to be given to the fan is determined by interpolation between the characteristic curves as stored and as deduced by calculation, and the converter is set to the corresponding frequency by means of the central calculation unit; and e) the velocity and the total pressure measurements are repeated to determine the resulting real flow rate, and the frequency of the converter is optionally corrected to obtain the required reference flow rate.

The above-defined sequence is performed under the control of the central calculation unit which, in particular, picks up the necessary information (total pressure and speed) in digital form and which controls the converter.

The central calculation unit may be constituted by a personal computer and it may be assisted by a local microcontroller for each fan. The necessary reference flow rate may be entered manually or it may be controlled by other parameters, for example the concentration of pollutants or the temperature in the network of ducts or at certain points in said network.

The invention also provides an installation for adjusting the air flow rate in a network of ducts, the installation comprising:

at least one air flow fan provided with an electric motor whose speed is a function of the frequency of the electricity supplied thereto;

a converter supplying electricity at an output frequency that is adjustable by a control signal applied to the converter; and measuring means for measuring the total pressure supplied by the fan, the flow rate in the network, and optionally the electrical power absorbed by the motor of the fan;

the installation being characterized in that it also includes a central calculation unit having:

a processor;

a memory provided to store in digital form at least one characteristic curve of total pressure as a function of flow rate, and optionally a characteristic curve of power as a function of flow rate of the fan, at least one predetermined speed;

means for displaying said curves; and data input means enabling a reference value to be set for the flow rate through the network;

the central calculation unit being designed to calculate the resistance of the gallery and the flow rate passing therethrough at a given instant, on the basis of the signals provided by the measuring means, and being designed to calculate the speed to be given to the fan by interpolation on the basis of the results of the preceding calculation and of the reference value for the flow rate, and to control the output frequency of the converter in such a manner as to achieve said speed.

Display means, such as a monitor, may be used also to show the power consumed as a function of flow rate and to make it possible to verify that the fan is operating in an acceptable efficiency range.

The invention will be better understood on reading the following description of a particular embodiment given by way of non-limiting example. The description refers to the accompanying drawings, in which.

Figure 1:
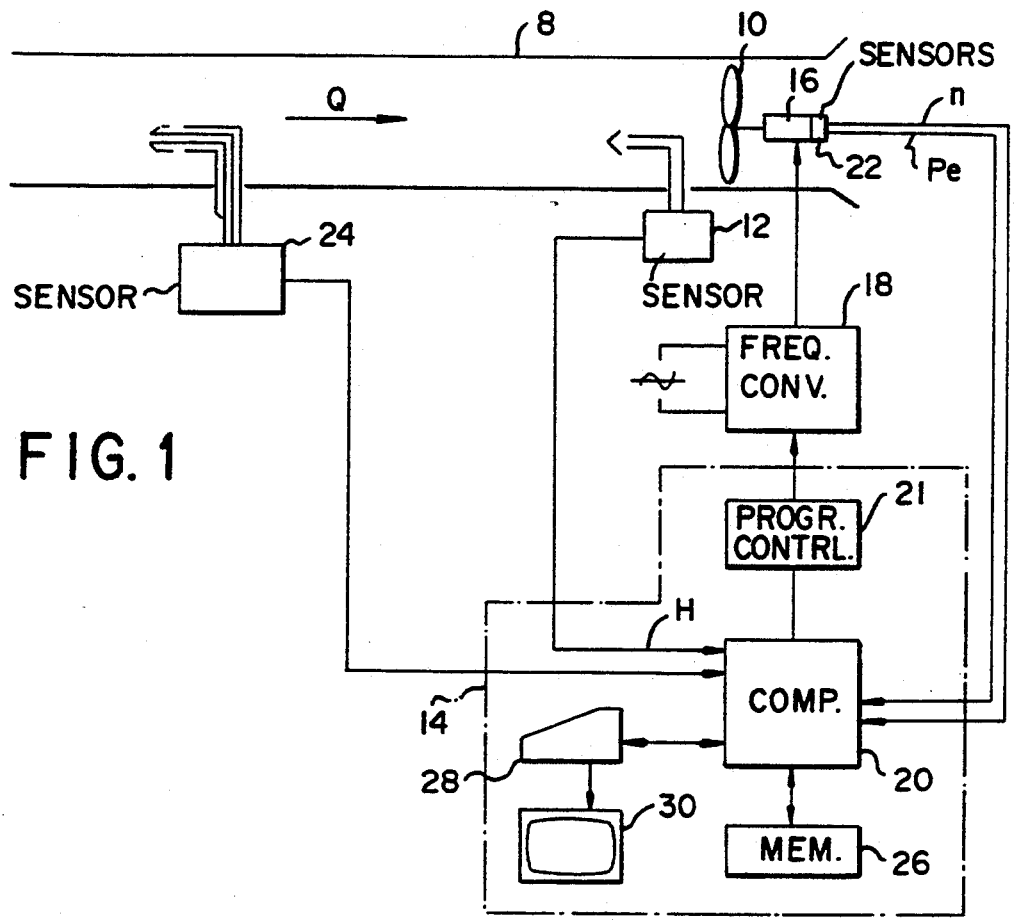
FIG. 1 is a highly simplified overall block diagram of an installation having a single fan.

The description begins with the case of ventilating a network of ducts by means of a single fan 10 placed at the end of an extraction well and rejecting air to the atmosphere, the network of ducts being represented solely by its exhaust 8 to the atmosphere. For such a suction fan 10, the static head H measured upstream from the fan is equal to the total pressure $H_t$ supplied by the fan, providing its inlet section is equal to its outlet section.

If the fan were mounted as an accelerator at an intermediate point in the duct, then the total pressure $H_t$ would represent the difference between the static or total heads upstream and downstream of the fan.

The static head H can be measured by means such as a sensor 12 having an air intake pointing orthogonally to the air flow direction and provided with a transducer. If adjustment is performed by means of a digital central calculation unit 14, which is the only case taken into consideration herein, then the sensor 12 must be provided with an output analog-to-digital converter or the calculation member must be provided with an input analog-to-digital converter for putting the data provided by the sensor 12 into digital form.

The fan 10 is driven by an asynchronous motor 16 powered by a frequency converter 18 whose output frequency is controlled by the central calculation unit 14 which, in the example shown, comprises a computer 20 and a micro-controller 21. In an installation having a plurality of fans, each of them may be provided with its own controller 21, thereby providing independent regulation on the basis of data delivered by a single central computer 20.

The motor 16 is provided with sensors 22 delivering its speed n and the electrical power it draws $P_e$ to the computer 20, either in digital form or else in the form of signals that can be put into digital form.

Means are also provided for delivering data representative of the air flow rate Q in the extraction well 8. The flow rate cannot be measured directly. The representative data may be the mean velocity V measured by means of an anemometer at a location where the flow section is known and where velocity distribution is uniform or is well-determined. However, such a solution is not very satisfactory since anemometers require expensive maintenance. In general, the velocity V and thus the flow rate are calculated on the basis of the dynamic head $H_d$ measured by means of a probe sensor 24. The relationship between velocity V and dynamic head $H_d$ is:

$$V = \sqrt{(2H_d/w)}$$

where w is the specific weight of the air.

The dynamic head must be measured at a location where the velocity distribution is known and reproducible so that the flow rate measurement is reliable. If necessary, a plurality of probes may be placed in the same section.

The head measuring probe may be a conventional double Pitot tube, supplying the dynamic head as the difference between the total head and the static head.

The network of ducts and the components of the installation, in particular the fan 10 and its drive motor 16, have a reaction time constant that must be taken into account. In addition, fluctuations are inevitable. Consequently, the central calculation unit 14 is programmed to take account of the time constants and optionally to take means of successive values of the input parameters obtained by time sampling.

Before defining the method implemented by the invention, it is necessary to recall certain facts relating to rotary fans and to flow in ducts, and to define the terminology used.

The air power Pa required for establishing a flow rate Q in a circuit can be written:

$$Pa = \Delta H * Q^2 \qquad (1)$$

where

ΔH is the head loss in the circuit (equal to the difference between the static head at the inlet and the static head at the outlet providing they are of equal section and thus correspond to the same air flow velocity); and Q is the flow rate.

The resistance R of the circuit is related to the head loss ΔH and to the flow rate by the following equation:

$$R = H/Q^2 \qquad (2).$$

The properties of a fan may be defined by a set of characteristic curves. The manufacturer provides such curves for calibration conditions at a given speed, generally the nominal speed $n_0$, and under normal conditions of temperature and pressure. These curves express the relationship between the total head $H_t$, the flow rate Q, the power Pa, and the efficiency of the fan; in most cases they also give another operating parameter as a function of flow rate Q.

Figure 2:
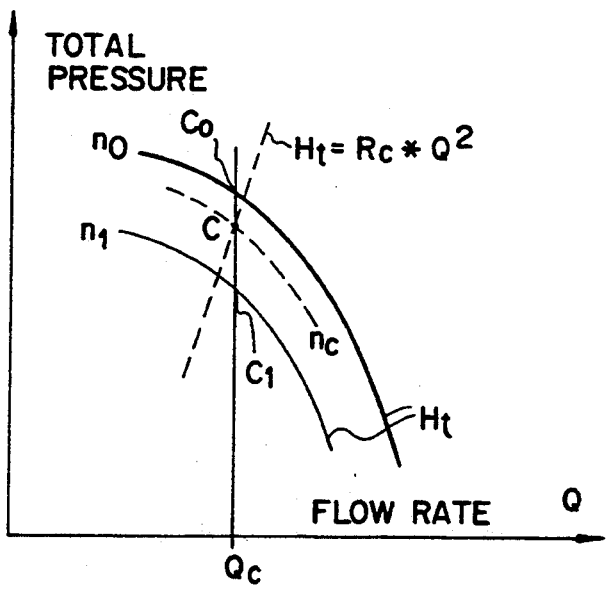
FIG. 2 is a graph showing a set of characteristic curves for total pressure $H_t$ as a function of flow rate Q for a fan that may be considered as being representative, and at a plurality of speeds $n_0$, $n_1$, $n_2$ (where $n_0$ is the nominal speed)

To implement the invention, the most important curves are those that express the total head $H_t$ as a function of flow rate Q. In FIG. 2, heavy lines show the curve provided by the manufacturer giving the head $H_t$ as a function of the flow rate Q at the nominal speed $n_0$. It may be stored in a memory 26 in sampled form.

Over a limited range of speeds for which the efficiency of the fan remains satisfactory, the total pressure $H_t$ varies in proportion to the square of the speed n in accordance with the following equation:

$$H_t = k_1 * n^2$$

where $k_1$ is a constant.

The flow rate and the air power Pa themselves vary as given by the following equations:

$$Q = k_2 * n$$

$$Pa = k_3 * n^3$$

where $k_2$ and $k_3$ are constants.

It can be seen that the characteristics for speed $n_1$ can be deduced from a nominal characteristic $H_t(Q)$ at speed $n_0$. For example, fine lines in FIG. 2 show $H_t(Q)$ at speed $n_1$ which is less than $n_0$ and which is obtained by simple proportion:

$$H_1 = (n_1/n_0)^2 H_0$$

for equal flow rate Q.

The method of the invention is implemented automatically by the central calculation unit 14 when it is operating under control conditions. The reference flow rate $Q_c$ to be supplied is entered into the computer 20, e.g. via a keyboard 28. On the basis thereof, the computer determines the appropriate reference speed $n_c$ and controls the converter 18 accordingly.

In a particular implementation, the calculator previously determines and stores a set of curves $H_t(Q)$ on the basis of the data supplied by the manufacturer, and in particular the data for $H_t$ at given $n_0$. Thereafter, during control per se:

a) on the basis of the measured velocity V, it calculates the flow rate Q at the instant the measurement was taken; thereafter, on the basis of the total pressure $H_t$ supplied by the fan and representative of the head loss and of the flow rate Q, it calculates the resistance $R_c$ of the network;

b) it calculates the value of the theoretical total pressure $H_t$ to be supplied by the fan 10 to obtain the selected flow rate $Q_c$; and c) it deduces the reference speed $n_c$ to be given to the fan from $H_t$ by interpolation between the stored characteristic curves (at speeds $n_0$ and $n_1$ in FIG. 2), and it sets the converter 18 to the corresponding frequency.

More precisely, the resistance $R_c$ is calculated (operation a)) using above equation (2) for the current operating point: the resistance $R_c$ in turn makes it possible to calculate the characteristic of pressure $H_t$ as a function of flow rate Q of the network of ducts for a given state of the network (operation b)): this characteristic is shown by a dashed curve in FIG. 2 for a particular case.

The reference flow rate $Q_c$ then corresponds to point C in the graph of FIG. 2.

The speed $n_c$ at which the characteristic of total pressure as a function of flow rate of the fan passes through C is determined (operation c)), and the computer controls the frequency of the converter accordingly, taking account of motor slip. The first calculation is simple interpolation between points $C_0$ and $C_1$ in FIG. 2. The points $C_0$ and $C_1$ may themselves be determined by polynomial interpolation between the stored samples defining the characteristic of pressure $H_t$ as a function of flow rate Q at the speeds $n_0$ and $n_1$.

The frequency f corresponding to the speed $n_c$ is set by the computer 20 via the micro-controller 21. In practice, the flow rate obtained is often not exactly the looked-for reference flow rate $Q_c$. The computer 20 then determines the real flow rate and the real total pressure on the basis of the data supplied by the sensors 12 and 24. Then, by interpolation, and by successive approximations, it can readjust the frequency until the desired flow rate is obtained with the necessary accuracy given in advance.

The characteristic of the network of ducts may vary as a function of time, e.g. on closing certain galleries. The central calculation unit 14 may be programmed to reperform the entire calculation at regular intervals or to track changes in the characteristic of the network by successive adjustments. It may also be designed to take action when the difference between the real flow rate and the reference flow rates exceeds a predetermined threshold.

It is preferable for the input magnitudes used for the calculation to be averages obtained over several successive samples, given the speed variations of the fan and the inevitable fluctuations in the air flow rate.

The central calculation unit 14 may be designed to control the frequency of the converter 18 taking account of the electrical power consumed Pe which is related to the slip of the motor 22.

The central calculation unit is advantageously provided with a display member such as a TV monitor 30 enabling the main operating parameters and the effective characteristics of the system to be displayed (shown in FIG. 2) and thus making it possible to verify firstly that the reference conditions are indeed satisfied and secondly that the fan is operating in regions of its characteristics where its efficiency is acceptable.

The invention can also be used to control a plurality of fans fitted to the same network of ducts, e.g. in the same portion of a mine. Such fans are generally placed in series or in parallel and the way in which they are controlled changes accordingly.

When two fans are connected in series, the total pressures they provide add, but the flow rate remains limited to the lower of the two values that the two fans can deliver. Such series twinning is advantageous only for networks having high resistance.

Figure 3:
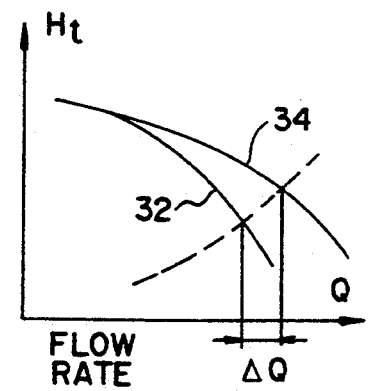
FIG. 3 is similar to FIG. 2 and shows the increase in flow rate obtained by parallel twinning of two fans having the same characteristics.

When two fans are connected in parallel, the flow rates supplied by the fans add, but the total pressure remains unchanged. Such parallel twinning is advantageous only when the network requires a flow rate that is very high or that is very variable (low flow rates can be obtained by stopping one of the fans), and in which the resistance is relatively low. By way of example, FIG. 3 shows the increase in flow rate $\Delta Q$ that can be obtained by putting two fans having the same pressure-flow rate characteristic 32 in parallel. Curve 34 shows the equivalent characteristic of the set of fans.

Figure 4:
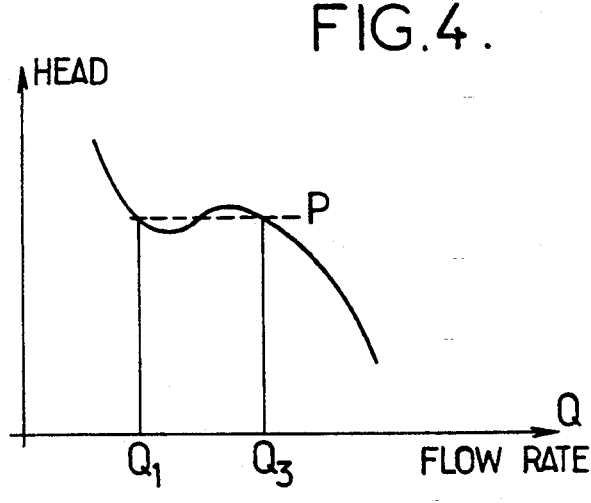
FIG. 4 is a graph for showing up a risk of flow rate unbalance in the vicinity of the surging zone when two fans are placed in parallel.

When a plurality of fans having identical characteristics are placed in parallel, control is not fundamentally different from that described above, except insofar as it is necessary to verify that the operating point of each of the fans is such that for the required operating pressure there exists only one possible flow rate. In a range of flow rates lying between the two points having horizontal tangents delimiting the surging zone, there exist three ways in which a given flow rate can be obtained. When two fans are in parallel, FIG. 4 shows that a first fan may take up a position on the point corresponding to flow rate $Q_3$ while the other fan following its characteristic curve from zero flow rate will come to rest on a first point corresponding to the pressure provided by the other fan, namely $Q_1$.

A simple control method then consists in giving both fans the same speed. A solution that is more complex and more advantageous consists in causing the actual operating state of the system to appear on the display means 30 in the form of the current characteristic curves for all of the identical fans in parallel that may be operating at different speeds, to enable a mean characteristic curve to be deduced therefrom. Since the total flow rate and the equivalent resistance of the system are then known, it is possible to determine whether a change in flow rate is required. If the current flow rate is different from the reference flow rate, then a simple method consists in distributing the flow rate changes uniformly over all of the fans: such distribution can be performed by the central calculation unit.

Figure 5:
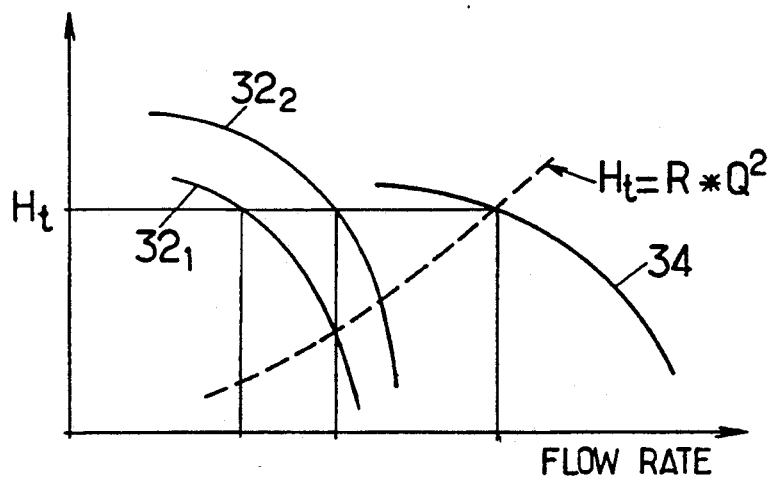
FIG. 5 is similar to FIGS. 2 and 3 and shows the characteristic that results from parallel twinning of two fans that have different characteristics.

The situation is a little more complex with fans having different characteristic curves such as those given at $32_1$ and $32_2$ in FIG. 5. It is nevertheless possible to determine the various speeds to be given thereto by tracing all of the characteristics that pass through the selected operating point. The two fans then operate in such a manner as to supply the same total pressure $H_t$ but while supplying different flow rates. It can then be useful for the central calculation unit 14 to store zones where there is a danger of surging in the form of excluded operating ranges.

Figure 6:
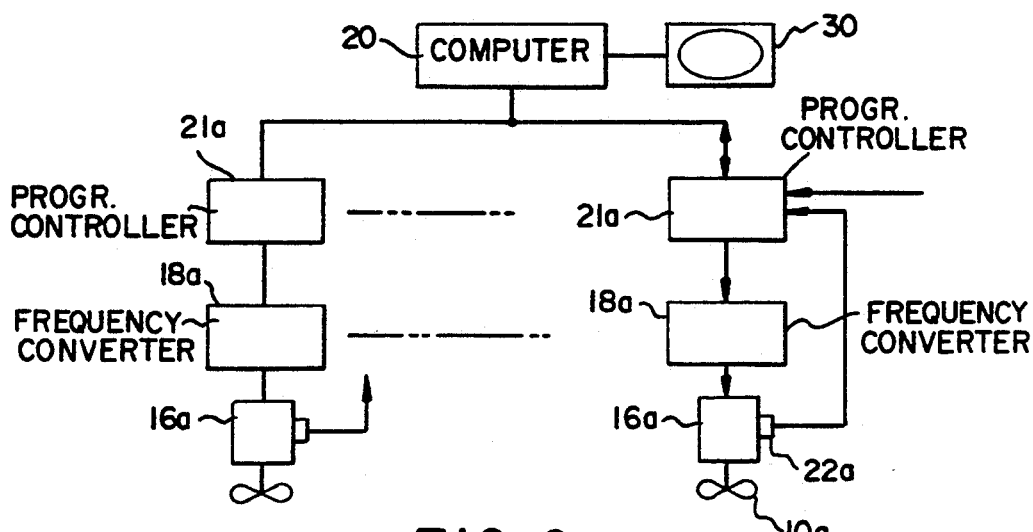
FIG. 6 is a block diagram of an installation having a plurality of fans.
Figure 7B:
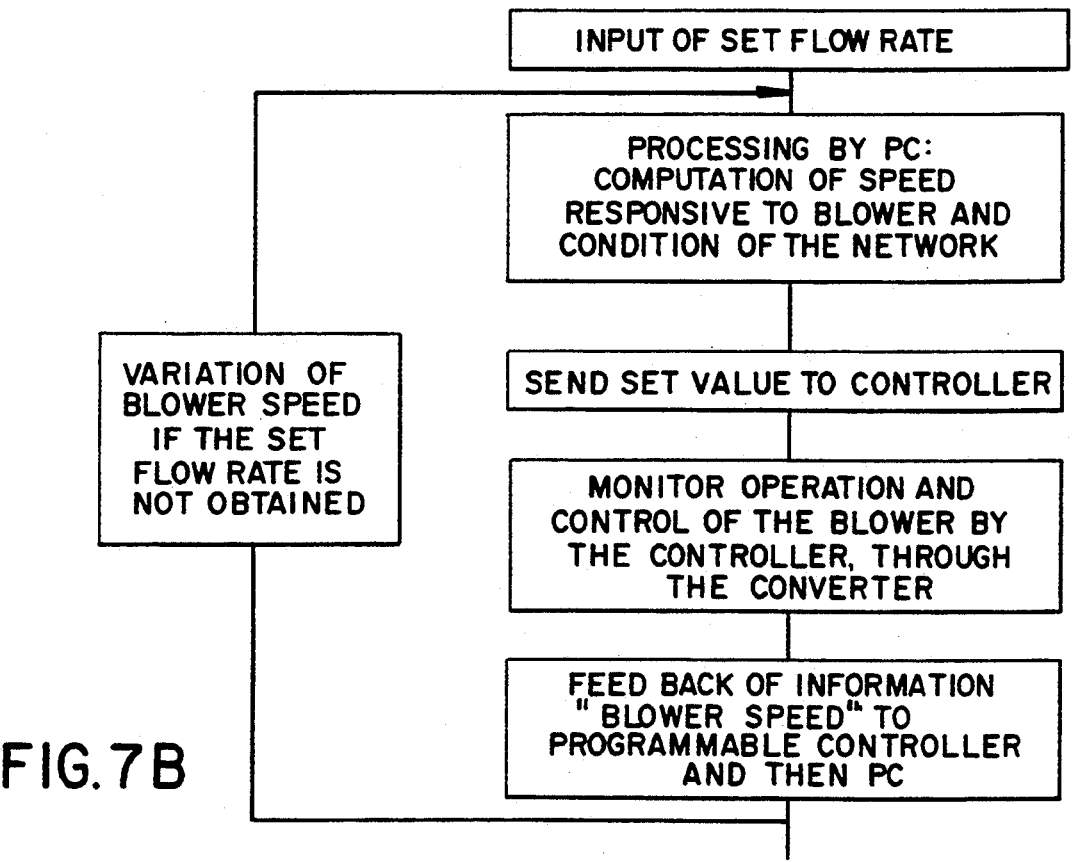
FIGS. 7A and 7B are flow charts.
Figure 7A:
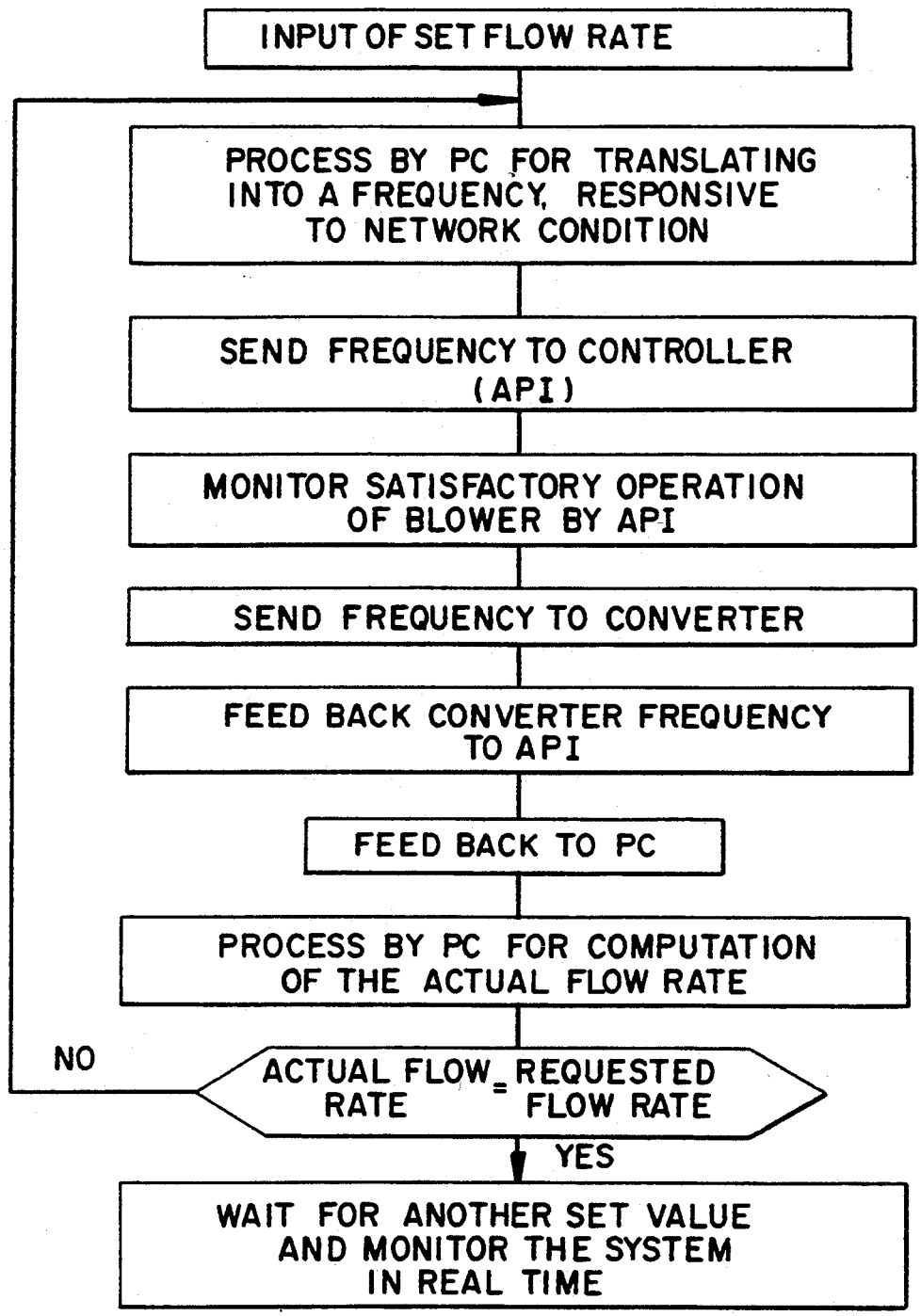

For a duct network having a plurality of fans $10_a$ placed in different ducts, it may be advantageous to split up the measuring, control and calculation functions between a single computer 20 and programmable controllers $21_a$ each associated with a single fan, as shown in FIG. 6.

The computer may be constituted, in particular, by a personal computer fitted with a communications card for communicating with the programmable controllers $21_a$ by means of a bus.

The controllers $21_a$ may be of the 100 U type from Siemens, having a central processor unit CPU 103, a 2 Kbyte programmable read only memory, an RS 485 serial communications card, an analog output card for controlling the associated frequency converter over a voltage range of +10 V to −10 V, and analog input cards.

The controller includes the analog-to-digital converters required for performing the conversions between digital data as processed by the computer and physical data.

The computer then provides the functions of controlling and monitoring the operation of the fans. Each controller $21_a$ has a plurality of functions:

It determines priorities between control parameters: for example in addition to sensors $22_a$ for sensing speed and electrical power, it may be provided with inputs for receiving signals from additional sensors, e.g. supplying the concentration of $CO_2$ in the duct, the temperature in the duct, the temperature of the motor $16_a$, etc., and by comparing them with stored values it may determine which parameter is to be given most weight in the control.

For example, immediately after a blast in a gallery, the $CO_2$ concentration may increase so that the priority then consists in reducing said concentration even if the power $P_e$ must temporarily exceed the power that can be tolerated under steady conditions by the motor $16_a$.

In other words, the controller may send that parameter to the computer 20 which is of most importance for control purposes, and on the request of the computer, it may send data representing the entire state of the installation in the region concerned by a particular fan.

Prior to controlling the converter $18_a$ to bring the fan up to the reference speed supplied by the computer, the controller may also be designed to verify that satisfying the reference will not cause safety conditions to be exceeded.

The installation shown in FIG. 6 also makes it possible to operate each fan in "local" mode, by storing reference values therein that may vary over time either under user control, or else in the event of faulty transmission between the computer 20 and the controller. Similarly, it is possible to control the speed of the fan manually in which case the controller $21_a$ serves merely to transmit data concerning its operation to the computer for monitoring by the computer.

Such a disposition makes it possible for the computer, in a first step, to store the characteristics of each fan in its environment, with periodic updates; the computer may also display on its associated TV monitor the operating characteristics of each of the fans and the way they vary over time.

I claim:

1. A method of adjusting air flow rate in a network of ducts by controlling the speed of at least one rotary fan (10) for causing air to flow, the fan being provided with an electric motor (16) whose speed is a function of the frequency delivered by an adjustable frequency converter controllable by a central calculation unit, the method being characterized in that:
    a) at least one characteristic curve of total pressure as a function of flow rate at at least one predetermined speed is stored in the central calculation unit (14);
    b) at least the flow velocity and the total pressure ($H_t$) supplied by the fan are measured under steady operating conditions and the flow rate at a current instant and the resistance of the network are deduced therefrom by calculation by means of the central unit;
    c) the reference flow rate to be supplied by the fan (10) is input into the calculation member, and the theoretical total pressure to be supplied by the fan (10) is deduced therefrom by calculation by the central unit (14);
    d) the speed to be given to the fan is determined by interpolation between the characteristic curves as stored and as deduced by calculation, and the converter (18) is set to the corresponding frequency by means of the central calculation unit; and
    e) the velocity and the total pressure measurements are repeated to determine the resulting real flow rate, and the set frequency of the converter is optionally corrected to obtain the required reference flow rate.

2. An installation for adjusting the air flow rate in a network of ducts, the installation comprising:
    at least one air flow fan (10) provided with an electric motor (16) whose speed is a function of the frequency of the electricity supplied thereto;
    a converter (18) supplying electricity at an output frequency that is adjustable by a control signal applied to the converter; and
    measuring means (12, 22) for measuring the total pressure supplied by the fan, the flow rate in the network, and optionally the electrical power (Pe) absorbed by the motor of the fan;
    the installation being characterized in that it also includes a central calculation unit (14) having:
    a processor or computer (20);
    a memory (26) provided to store in digital form at least one characteristic curve of total pressure as a function of flow rate, and optionally a characteristic curve of power as a function of flow rate of the fan, at at least one predetermined speed;
    means (30) for displaying said curves; and
    data input means enabling a reference value ($Q_c$) to be set for the flow rate through the network, the central calculation unit (14) being designed to calculate the resistance (R) of the network and the flow rate (Q) passing therethrough at a given instant, on the basis of the signals provided by the measuring means, and being designed to calculate the speed to be given to the fan by interpolation on the basis of the results of the preceding calculation and of the reference value for the flow rate, and to control the converter in such a manner as to achieve said speed.

3. An installation according to claim 2, characterized in that said measuring means include analog-to-digital converters providing digitized samples to the central unit.

4. An installation according to claim 3, characterized in that the central unit (14) is designed to take account of mean values of the total pressure and of the flow rate.

5. An installation according to claim 2, characterized in that the means for measuring the flow rate include means for measuring the dynamic head in the duct, on the basis of which the central unit determines the flow rate.

6. An installation according to claim 2, characterized in that it includes display means for showing the current characteristic curves as a function of the flow rate.

7. An installation according to claim 2, characterized in that the central unit is designed to compare the reference flow rate with the current flow rate and to readjust the speed of the fan at regular intervals or whenever the difference between the flow rates exceeds a predetermined threshold.

8. An installation according to claim 2 having a plurality of fans disposed in parallel, the installation being characterized in that the central unit is designed to distribute the reference flow rate and variations in said flow rate evenly between the fans.

* * * * *